United States Patent [19]

Delmonte

[11] 4,316,925
[45] Feb. 23, 1982

[54] FIBER REINFORCED CEMENTITIOUS CASTINGS

[76] Inventor: John Delmonte, 1753 N. Allen Ave., Glendale, Calif. 91201

[21] Appl. No.: 195,335

[22] Filed: Oct. 9, 1980

[51] Int. Cl.³ .............................................. B32B 9/00
[52] U.S. Cl. ................... 428/105; 428/109; 428/212; 428/245; 428/297; 428/367; 428/408; 428/423.1; 428/319.1; 428/319.7
[58] Field of Search ........ 428/245, 367, 288, 310 HC, 428/408, 297, 212, 423.1, 105, 109

[56] References Cited

U.S. PATENT DOCUMENTS

| | | | |
|---|---|---|---|
| 4,067,164 | 1/1978 | McMillan | 428/310 HC |
| 4,133,928 | 1/1979 | Riley et al. | 428/310 HC |
| 4,229,497 | 10/1980 | Piazza | 428/310 HC |
| 4,252,588 | 2/1981 | Kratsch et al. | 428/408 |

*Primary Examiner*—James J. Bell
*Attorney, Agent, or Firm*—Frederick E. Mueller

[57] ABSTRACT

A reinforced structural casting comprises a cementitious material having a unitary reinforcement of consolidated, collimated or other generally unidirectionally aligned or woven graphite or carbon fibers, sometimes carried in a preformed resin binder, the graphite or carbon fibers preferably being in the range of about 7–12 microns in diameter and having moduli of elasticity in the range of 20–100 million psi. It may, for example, be a concrete beam reinforced by a rod-like preform of graphite fibers.

17 Claims, No Drawings

FIBER REINFORCED CEMENTITIOUS CASTINGS

BACKGROUND OF THE INVENTION

The present invention relates to inorganic cementitious structures such as concrete beams or gypsum castings and, more particularly, to structures of this type that are reinforced by preformed shapes comprising carbon or graphite fibers.

Portland cement concrete is commonly reinforced by steel rods which provide stiffness, impact strength and load bearing characteristics. It is also known, as in U.S. Pat. No. 4,199,366, to add various natural and synthetic fibers to various cementitious substrates. In concrete mixtures before they are poured, natural fibers such as cotton, jute, sisal, hemp and wool have been mixed into the concrete, as have such synthetic fibers as rayon, nylon, polyesters, polyvinyl alcohol, polyacrylonitrile (PAN), polyvinyl chloride, polyethylenes, and miscellaneous fibers such as glass, carbon, and metallic carbides. It is also known to use various fiber reinforcements for other types of cementitious structures such as gypsum castings based on the hemi-hydrates of calcium sulphates, or magnesium-oxide, chloride, lime and other inorganic cementitious mixtures.

Most of the natural and synthetic fibers mentioned above will lose some of their reinforcing qualities in concrete over the years as they are exposed to the alkaline environment of the free-lime appearing in Portland cement concrete. Even glass fibers suffer degradation in time during their utilization in Portland cement concrete. As for reinforcing steel rods, they must be well encapsulated within a Portland cement concrete structure to minimize the effects of air and moisture which cause corrosion of the steel. The products of steel corrosion, being of lower density than steel, have a volumetric expansion on forming which may crack the concrete, which imposes a design limitation in that steel reinforcements cannot be positioned too close to the surface since surface cracks will appear and the quality of the concrete structure will deteriorate.

While the randomly oriented fibers of the prior art contribute to toughness and fatigue resistance of the reinforced structure, fairly large quantities thereof must be used, typically in excess of 3% by weight, in order to obtain substantial improvements. By the time such volumes of these fibers are added and randomly dispersed by prevailing mechanical mixers, the slurry is thickened to such an extent that more energy is required and, also, the probability of air entrapment is greatly increased. Thus, while the addition of fibers in this fashion may enhance the concrete toughness, there is also the undesirable consequence from a long range standpoint of loss in environmental resistance due to the presence of occluded air pockets.

SUMMARY OF THE INVENTION

The carbon and graphite fiber reinforced structures of this invention do not possess the above-mentioned disadvantages of the prior art. I have discovered combinations of carbon and/or graphite fibers which when used in a uniquely disposed arrangement in cementitious structures, cannot only be used as replacement for iron and steel reinforcing bars but, also, will out-perform other fibers in longevity, as well as in stiffening and reinforcing cementitious structures.

As contrasted to steel reinforcing rods, the predisposed carbon and graphite fibers, which are chemically inert, can be brought close to the surface or so positioned relative to the cross-sectional area of the Portland cement concrete structure where they contribute most effectively to the stiffness and durability of the structure without experiencing limitations of oxidation and adverse chemical reactions.

The beforehand consolidation of the carbon and graphite fibers permits a greater amount of fibers to be included into a cementitious structure and the stiffness of the resulting structure is greatly enhanced.

The carbon and graphite fibers may be utilized as either the sole or predominant fiber in the cementitious structure. In some cases there are advantages to be gained from hybrids of carbon and/or graphite fibers in combination with glass fibers and/or synthetic fibers such as the Aramids and/or silicon carbide fibers.

The carbon and graphite fibers are commercially available in filaments or as tows comprising 600–10,000 short staple fibers in which the individual fibers are in the range of 7–11 microns in diameter. In accordance with the invention these are processed further into intermediates which function as the reinforcements. Representative forms of such intermediates of pre-disposed carbon and graphite fibers are unidirectional tapes, wherein the fibers are laid flat or twisted into cords and held in place by a suitable binder or resin; resin impregnated woven goods; unidirectional tapes or woven goods predisposed on a low density chemically resistant core; or cured carbon or graphite tapes impregnated with synthetic resins that are shaped or placed about steel reinforcements. Some of such intermediates also lend themselves to modification to include areas of increased thickness or other anchoring means to assist bonding to the cementitious structure. These intermediates may be cast in place within the Portland cement concrete or other cementitious structure by placement into the slurry at the appropriate time prior to hardening thereof to produce a casting of the invention.

DESCRIPTION OF PREFERRED EMBODIMENTS

In one embodiment the invention may take the form of unidirectional tapes of collimated, essentially unidirectionally oriented carbon or graphite fibers wherein the fibers are laid flat, laminated into flat sheets cured with a synthetic resin binder such as an epoxy or polyester. The resulting composite is then cast within the desired location by hardening of a cementitious slurry of interest, e.g. plaster of Paris, in which it has been emplaced. Pultrusion processes can produce various structural shapes of oriented carbon graphite fibers and cured resin matrices.

In another embodiment woven fabrics of carbon or graphite fibers may be cured and consolidated into composite structures by synthetic resin binders. A cured thermosetting material such as epoxy, polyimide, polyester, phenolic resin, silicone or the like may be employed. Synthetic resin binders may include thermoplastics such as a polysulfone, polystyrene, polyvinyl fluoride, polyvinyl chloride or polyphenylene sulphide. In these cases, the resulting intermediate is a composite of binder and fibers in which the volume percent of fibers in the composite preferably exceeds 30%, and 50–65% is preferable. In either case, the concentration of fibers is much greater than can be obtained by mechanical mixing into Portland cement concrete, for example, of loose fibers. The resin binder itself should be selected on the basis of its resistance to the environment of the slurry and completed reinforced structure of interest. For example, in the case of a Portland cement concrete structure to be reinforced, carbon or graphite fibers may be incorporated in a preformed intermediate having a binder of an amine cured diglycidyl ether of Bisphenol A (epoxy resin).

In another embodiment the carbon or graphite fibers may be predisposed in the form of woven goods which are then impregnated with a suitable resin of a sufficient volume which upon curing will maintain the structural integrity and desired alignment of the fibers. Such woven products may be laid up to attain a distribution of fibers in the final product which will attain the desired modulus of elasticity in the composite, as well as the desired coefficient of thermal expansion in the composite. Tapes or miscellaneous geometric shapes may be cut from the resin impregnated carbon or graphite fiber goods, or suitable layups in three dimensions produced and consolidated into a structural reinforcing entity by heat and pressure. These shapes, either as single layers or multiple layers, are suitable for use as structural inserts into Portland cement concrete. Design criteria will determine the fiber distribution, strength, and coefficients of expansion to match, to exceed, or to be less than an accompanying steel reinforcement, if desired, and Portland cement concrete.

For example, using a high strength fiber epoxy composite prepared with greater than 50% (80% preferred) unidirectional graphite fibers and woven graphite fibers set at say 45° to 80° with respect to the unidirectional fibers (preferred 10 to 20@ at 45° to 50°), it is possible to offer a composite with a moduli of elasticity in excess of 18,000,000 psi and a linear coefficient of expansion of 4 to 7 microinches per inch per degree centigrade. This thermal expansion coefficient lies within the range of Portland cement concrete. If a lower coefficient of expansion is required in the composite accompanied by a higher modulus, a larger percent of unidirectional fibers would be used. With a very low coefficient of thermal expansion in the graphite composite, further structural advantages may be designed into the concrete structure.

In yet another embodiment unidirectional carbon or graphite fibers, or a cloth woven thereof, are predisposed or cured and bonded to a low density chemically resistant core, such as polystyrene foam, providing an intermediate which may be placed in a Portland cement concrete slurry in a desired location which when cured will have desirable strength-weight characteristics. Inserts of cured unidirectional graphite tape (6-12 mils thick) mounted on a ⅛ inch polyurethane core, when added to ½" gypsum casting, increase flexural strength of the casting ten-fold.

In a further embodiment, cured carbon or graphite tapes are shaped or placed about steel reinforcement to provide local reinforcement to the steel. The fiber insert also provides additional reinforcement to the concrete which inhibits steel corrosion. In this instance when the steel rather than the carbon or graphite composite supplies the desired stiffness and toughness to the concrete, the fiber composite will maintain the integrity of the Portland cement concrete and provide an additional moisture barrier.

In another embodiment the profile of the predisposed carbon or graphite fibers may be altered with shape characteristics, such as with knots, enlarged cross sections, or other anchoring means, to assist their mechanical bonding to the Portland cement concrete when brought into contact with the semi-liquid slurry. In this manner dimensional control, or tension or compression stresses may be developed in the concrete in the desired areas. With the availability of structural composite inserts which can match or control with respect to the coefficient of thermal expansion of the concrete considerable design advantages are apparent.

Finally, in one embodiment of the invention high modulus graphite fibers are selected, such as may be made from PAN or from pitch. These exhibit moduli of elasticity a range of 20-100 million psi. These fibers are then combined, handled or treated to form an intermediate structure of desired form, for example a rod-like structure in which the fibers are carried in an appropriate resin, having a coefficient of thermal expansion close to that of Portland cement concrete. The highest moduli of elasticity carbon or graphite fibers possess a slight negative coefficient of expansion along their axial direction and the intermediate rod-like structure constitutes a reinforcement which closely resembles the coefficient of thermal expansion of the concrete. Thus, the invention provides a reinforcement which may exceed the moduli of elasticity of steel, 30 million psi, at a considerable weight saving and has both strength and modulus advantages over steel, sufficiently so to overcome the disadvantage of the high cost of the graphite fibers employed.

While exemplary embodiments of the invention have been described, it will now be understood that the invention is capable of other embodiments and of being practiced and carried out in a wide variety of ways. Also, it should be understood that the phraseology and terminology employed herein is for the purpose of description and should not be regarded to as limiting. For example, as used in the claims, "fibers of carbon" includes graphite, which has been prepared by further heat treatment at very high processing temperatures.

I claim:

1. A hardened structure comprising a coalesced cement-like material having as a discrete internal portion of the cross section of said structure a preformed composite reinforcement comprising a gathered plurality of substantially unidirectionally aligned fibers of carbon and, a hardened binder material constituting the means for holding said gathered plurality of fibers in said alignment, said composite reinforcement having a coefficient of thermal expansion of predetermined value relative to the coefficient of thermal expansion of said coalesced cement-like material.

2. A structure as in claim 1 in which said binder material comprises a synthetic resin.

3. A structure as in claim 2 in which said reinforcement has shape characteristics for mechanically keying said reinforcement relative to said coalesced material.

4. A structure as in claim 2 in which said resin and said fibers comprise a reinforcement in which at least 30% by volume of said reinforcement constitutes fibers.

5. A structure as in claim 4 in which said fibers constitute 50 to 65%, approximately, by volume of said reinforcement.

6. A structure as in claim 1 in which said fibers are in the range of 7-12 microns in diameter.

7. A structure as in claim 1 in which said gathered plurality of fibers comprise part of a weave incorporating fibers of carbon crossing said unidirectionally aligned fibers.

8. A structure as in claim 1 in which said fibers are bonded to a surface of a synthetic foam material.

9. A structure as in claim 1 further having a steel rod about which said fibers are disposed to extend longitudinally thereof.

10. A structure as in claim 1 in which said fibers comprise graphite fibers having moduli of elasticity in the range of 20–100 million psi.

11. A structure as in claim 10 in which said coalesced material and said reinforcement have substantially similar coefficients of thermal expansion.

12. A structure as in claim 10 in which said coalesced material and said reinforcement have substantially different coefficients of thermal expansion.

13. A structure as in claim 10 in which said coalesced material comprises Portland cement concrete and in which said plurality of graphite fibers is gathered into essentially cylindrical rod-like form.

14. A structure as in claim 1 in which said coalesced material comprises gypsum.

15. A structure as in claim 1 in which said reinforcement also has fibers of carbon crossing said unidirectionally aligned fibers in a range of included angles of 45 to 80 degrees, with said unidirectional fibers comprising at least 50% of the fiber contents of said reinforcement.

16. A structure as in claim 15 in which said crossing fibers comprise 10 to 20% of the fiber content of said reinforcement and cross said unidirectional fibers at 45 to 50 degrees.

17. A structure as in claim 1 further having a low density chemically resistant core selected from the group of polystyrene and polyurethane onto which said fibers are cured and bonded.

* * * * *